(12) United States Patent
Gattone et al.

(10) Patent No.: US 7,824,087 B2
(45) Date of Patent: Nov. 2, 2010

(54) HEADLAMP ADJUSTER

(75) Inventors: Michael T. Gattone, Tinley Park, IL (US); Stanley Piotrowski, Addison, IL (US); Kui-Chiu Kwok, Gurnee, IL (US)

(73) Assignee: Asyst Technologies, LLC, Kenosha, WI (US)

( * ) Notice: Subject to any disclaimer, the term of this patent is extended or adjusted under 35 U.S.C. 154(b) by 0 days.

(21) Appl. No.: 12/123,071

(22) Filed: May 19, 2008

(65) Prior Publication Data

US 2008/0291690 A1 Nov. 27, 2008

Related U.S. Application Data

(60) Provisional application No. 60/931,343, filed on May 23, 2007.

(51) Int. Cl.
*F21V 19/02* (2006.01)
(52) U.S. Cl. .......................... 362/523; 362/460; 362/529
(58) Field of Classification Search ......... 362/523–532, 362/460
See application file for complete search history.

(56) References Cited

U.S. PATENT DOCUMENTS

| | | | |
|---|---|---|---|
| 4,674,018 A | 6/1987 | Ryder et al. | |
| 4,703,399 A | 10/1987 | Van Duyn et al. | |
| 4,737,891 A | 4/1988 | Burton | |
| 4,796,494 A | 1/1989 | Eckenrode et al. | |
| 4,930,367 A | 6/1990 | Nagasawa | |
| 4,939,945 A | 7/1990 | Ryder et al. | |
| 5,079,676 A | 1/1992 | Lisak | |
| 5,163,746 A | 11/1992 | Lisak | |
| 5,214,971 A | 6/1993 | Burton et al. | |
| 5,285,360 A | 2/1994 | Kanner | |
| 5,309,780 A | 5/1994 | Schmitt | |
| 5,390,098 A | 2/1995 | Reiland | |
| 5,483,426 A | 1/1996 | Lewis et al. | |
| 5,653,548 A | 8/1997 | Amdahl | |
| 5,669,695 A | 9/1997 | Parker | |
| 5,707,133 A * | 1/1998 | Burton | ........................ 362/460 |
| D396,312 S | 7/1998 | Galinski et al. | |
| 5,775,795 A | 7/1998 | Christian et al. | |
| 5,897,202 A | 4/1999 | Denley | |
| 6,017,136 A | 1/2000 | Burton | |
| 6,042,254 A | 3/2000 | Burton | |
| 6,050,712 A | 4/2000 | Burton | |
| D423,919 S | 5/2000 | Galinski | |
| 6,231,222 B1 | 5/2001 | Daumueller et al. | |
| 6,257,747 B1 | 7/2001 | Burton | |
| 6,447,154 B1 | 9/2002 | Denley | |
| 6,450,674 B2 | 9/2002 | Denley | |
| 6,474,850 B1 | 11/2002 | Burton | |
| 6,527,427 B1 | 3/2003 | Schroder | |
| 6,619,809 B2 * | 9/2003 | Chiang | ........................ 362/37 |
| 6,692,176 B1 | 2/2004 | Fladhammer | |
| 6,758,622 B2 | 7/2004 | Burton | |
| 6,773,153 B2 * | 8/2004 | Burton | ........................ 362/528 |
| 6,913,374 B2 | 7/2005 | Burton | |

(Continued)

*Primary Examiner*—Anabel M Ton
(74) *Attorney, Agent, or Firm*—Brian G. Gilpin; Jennifer L. Gregor; Godfrey & Kahn, S.C.

(57) ABSTRACT

A headlamp adjuster includes an output shaft driven by a co-rotatable gear. Threads on the shaft engage splines in a thin wall boss, the splines having limited circumferential engagement with the screw. The thin wall boss deflects outwardly in response to forces that build in the engagement of the shaft and splines, to release driving engagement between the splines and the shaft.

17 Claims, 4 Drawing Sheets

U.S. PATENT DOCUMENTS

| | | |
|---|---|---|
| 6,918,691 B2 | 7/2005 | Gattone et al. |
| 6,974,231 B2 | 12/2005 | Burton |
| 6,979,109 B2 | 12/2005 | Burton |
| 7,004,607 B2 | 2/2006 | Aguinaga |
| 7,040,788 B2 | 5/2006 | Brazas et al. |
| 7,052,164 B2 | 5/2006 | Burton |
| 7,066,632 B2 * | 6/2006 | Burton ................ 362/524 |
| 7,114,835 B2 | 10/2006 | Brazas |
| 7,118,259 B2 | 10/2006 | Fladhammer |
| 7,150,541 B2 | 12/2006 | Burton |
| 7,198,392 B2 | 4/2007 | Hobbs et al. |
| 7,264,376 B2 | 9/2007 | Burton |
| 7,284,887 B2 | 10/2007 | Fladhammer |
| 7,354,183 B2 | 4/2008 | Burton |
| 7,438,457 B2 | 10/2008 | Whynott |
| 7,517,123 B2 | 4/2009 | Aguinaga |
| 2003/0043591 A1 * | 3/2003 | Burton ................ 362/528 |
| 2008/0175014 A1 | 7/2008 | Fladhammer |

* cited by examiner

HEADLAMP ADJUSTER

CROSS-REFERENCE TO RELATED APPLICATIONS

The present regular United States patent application claims the benefits of U.S. Provisional Application for Patent Ser. No. 60/931,343, filed on May 23, 2007.

FIELD OF THE INVENTION

The present invention relates to adjustment mechanisms and, more particularly, the invention relates to adjustment mechanisms useful for adjusting the aim of motor vehicle headlights.

BACKGROUND OF THE INVENTION

Headlamps on motor vehicles require proper aiming, both vertically and horizontally, for safe and optimal performance. Accordingly, adjustment or "aiming" is performed before a vehicle is put into service and may be performed from time to time thereafter if vibration or other conditions or events move the headlamp away from optimal positioning. If the headlamp is not properly adjusted vertically, the light may be directed too close to the vehicle, not adequately illuminated more distant objects. Conversely, if the headlamp is aimed to direct the light too far in the distance, the area in front of the vehicle may not be properly illuminated for adequate recognition of something in front of the vehicle. Further, a headlamp aimed too distant may blind oncoming drivers even in the dimmed or low beam condition.

Proper horizontal adjustment is just as important as proper vertical adjustment. If the headlamp is aimed to direct the beam of light too far to the left, oncoming drivers can be blinded. If focused too far to the right, the primary field directly in front of the automobile may not be properly illuminated. Improperly directed headlamps can be distracting both to the operator of the vehicle and to other drivers approaching the vehicle.

It is known to provide headlamp assemblies adjustable about both vertical and horizontal axis with adjusters operated by screwdrivers or other implements for lengthening and shortening the adjuster to cause the headlamp assembly to pivot about the axis. Some known adjustment mechanisms are component style systems having individual components requiring assembly at the time of installation. Such adjusters can include bushings, bosses, O-rings and push nuts that need to be connected to a screw during installation. Although adjusters of this type have proven to be useful, because of the many individual components required, labor for assembly and installation are high. It is preferable to have a pre-assembled adjuster that can be installed quickly and easily in the headlamp assembly and be ready for immediate adjustment.

In some known adjuster configurations, an output shaft is operatively connected to a movable reflector in the headlamp assembly. Linear movement of the output shaft pivots the reflector to change the direction of light. One or several gears can be driven by screwdrivers or other implements for rotating mechanisms in the adjuster and causing linear movement of the output shaft. Problems and difficulties can be encountered if the adjuster is adjusted too far. If moved axially longer than intended, the headlamp assembly can be damaged or the adjuster can be damaged requiring repair or replacement. If withdrawn too far, the output shaft can become disengaged from its driving mechanisms, again causing difficulties and problems. When such occurs on an assembly line, assembly line output is adversely affected. If over adjustment occurs after the vehicle has been placed in use, access for repairing or replacing the adjustment mechanism can require significant disassembly and cost in time and expense. Placing axial restraints on the movement of the output shaft can result in damage to the drive mechanisms of the adjuster, particularly if powered tools are used for causing the adjustment.

What is needed is a headlamp adjusted that can tolerate over adjustment in either direction, without damage to the adjuster or to the headlamp assembly in which it is installed.

SUMMARY OF THE INVENTION

The present invention provides an adjuster that automatically disengages the driving mechanism in the adjuster so that axial movement of the output shaft is interrupted when the extreme limits of adjustment have been reached. The adjuster automatically re-engages the drive mechanism if adjustment operates in the opposite direction.

In one aspect of one form thereof, the present invention provides an automobile headlamp adjuster with a housing securable to a headlamp panel and a shaft extending through the housing. The shaft has an end for engaging a headlamp reflector and a threaded portion provided along at least a portion of a length of the shaft. A boss fixed in axial position relative to the housing, has at least one member of circumferentially limited dimension engaging the threaded portion of the shaft such that rotation of the shaft causes axial movement of the shaft relative to the housing. A space is defined outwardly of the boss member, and the boss member is radially deformable into the space in response to forces created in the engagement of the member and the threaded portion of the shaft.

In another aspect of another form thereof, the present invention provides an automobile headlamp adjuster with a housing and a shaft extending through the housing. The shaft has an end for engaging a headlamp reflector, and a screw thread provided along at least a portion of a length of the shaft. A gear held rotatably in the housing, is co-rotatable with the shaft; and the shaft is axially movable relative to the gear. A boss in fixed axial and rotatable positions relative to the housing has a radially deflectable member engaging the thread on the shaft.

In a still further aspect of a still further form thereof, the present invention provides a vehicle headlamp adjuster with a housing and a boss in the housing having a thin walled deflectable sleeve. The sleeve is unsupported outwardly thereof and has a plurality of axial splines on an inner surface thereof. The boss is held substantially fixed axially and rotatably relative to the housing. A shaft extends through the housing and the sleeve. The shaft has an end for engaging a headlamp reflector and a thread provided along at least a portion of a length of the shaft. The thread engages the splines. An adjustment gear is co-rotatable with the shaft in the housing, and the shaft is axially movable relative to the housing and relative to the gear between fixed axial limits. The sleeve is radially deformable in response to increasing forces in the engagement of the shaft and the splines, to disengage the splines from the threaded portion of the output shaft.

A feature of the present invention in one form is providing a headlamp adjuster that is compact and easy to install after pre-assembly.

Another advantage of the present invention in another form thereof is providing a headlamp adjuster that reduces the potential for damage to the adjuster or to the headlamp assembly if adjustment approaches the extreme range of movement for the adjuster.

Other features and advantages of the invention will become apparent to those skilled in the art upon review of the following detailed description, claims and drawings in which like numerals are used to designate like features.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 1:
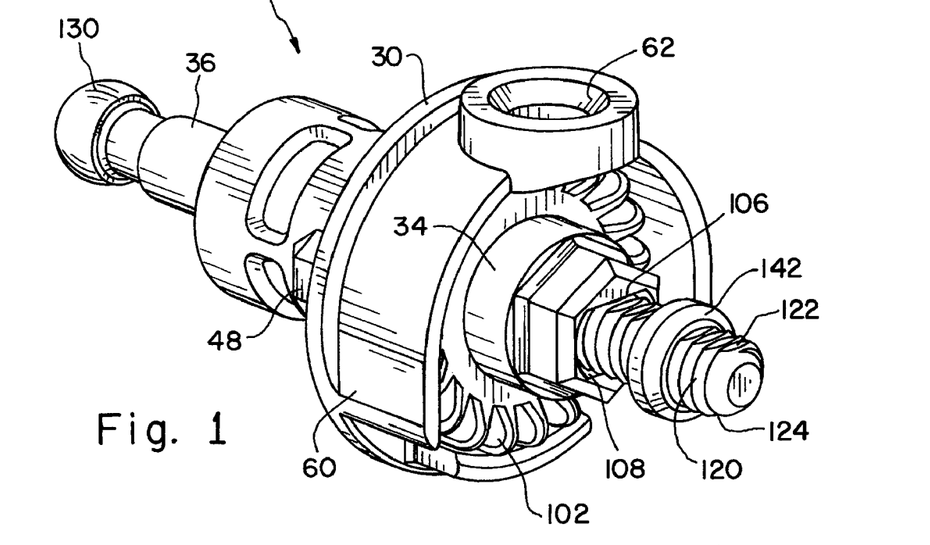
FIG. 1 is a perspective view of a headlamp adjuster in accordance with the present invention.

Referring now more specifically to the drawings and to FIG. 1 in particular, numeral 20 designates a headlamp adjuster in accordance with the present invention. Adjuster 20 is used in a headlamp assembly including an assembly panel 22 (FIG. 2) which retains adjuster 20 in a fixed position relative thereto. A cup or ball socket 24 (FIG. 10) engages an axial end of the adjuster, to be moved by the adjuster and thereby adjust the reflective position of a reflector in which cup 24 is installed. Adjuster 20 is manipulated or adjusted by an implement such as a screwdriver 26 or other driving tool for operating the adjuster, as will be described in greater detail hereinafter.

Headlamp adjuster 20 can be made of plastic or, alternatively, parts thereof can be made of other non-corrosive materials such as zinc, stainless steel or the like. As a further alternative, inexpensive metals also can be used for some of the components of adjuster 20 to be described hereinafter.

Headlamp adjuster 20 includes a housing 30, a boss 32 and a drive gear 34 nested one in the other in an overall assembly. An output shaft 36 extends through housing 30 and operatively engages boss 32 and drive gear 34 as will be described more fully hereinafter. Shaft 36 is physically configured to engage drive gear 34 in co-rotational relationship having relative axial movement therebetween, while also engaging boss 32 which remains in fixed axial and rotational positions in housing 30.

Figure 2:
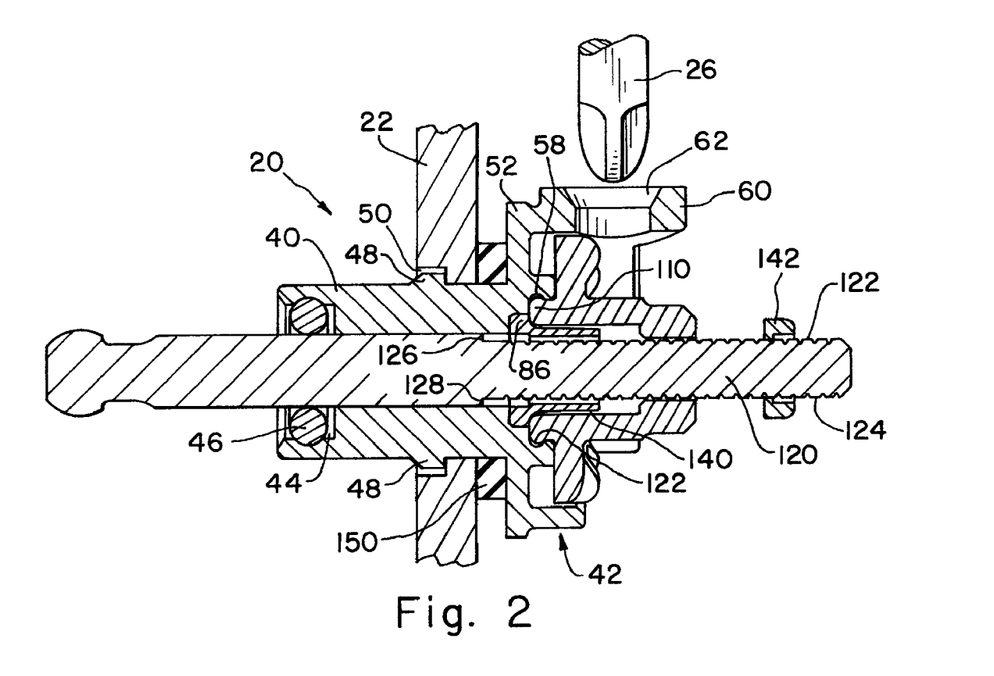
FIG. 2 is a cross-sectional view of the headlamp adjuster shown in FIG. 1, further illustrating a tool about to be inserted for performing adjustment.
Figure 3:
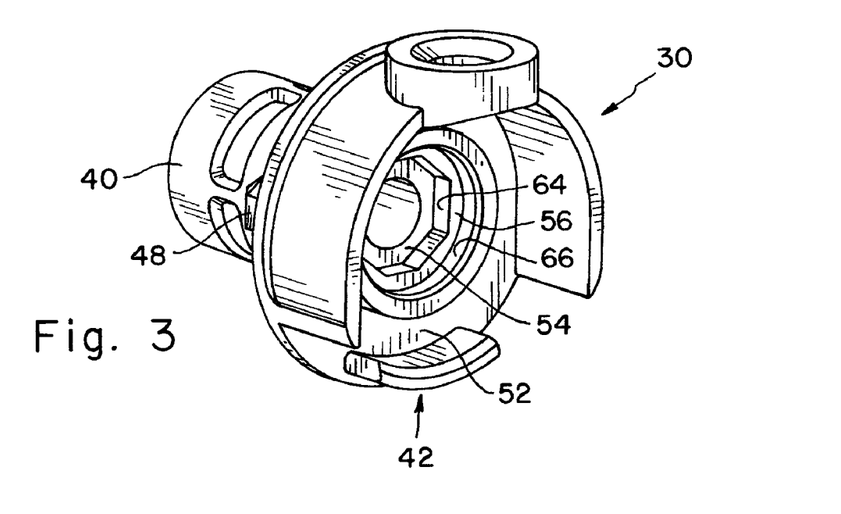
FIG. 3 is a perspective view of the housing of the adjuster shown in the previous drawings.
Figure 4:
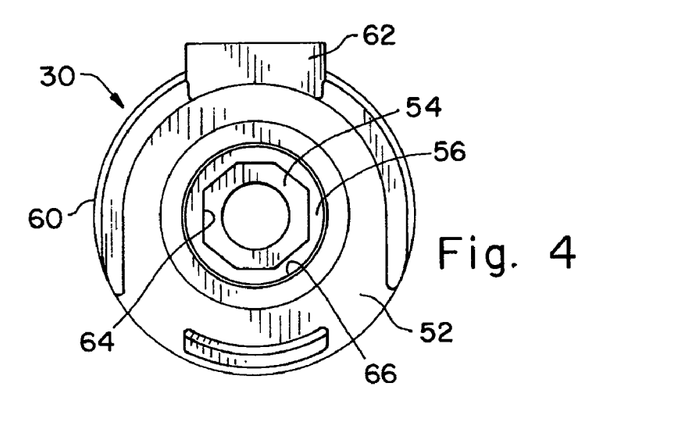
FIG. 4 is an end view of the housing shown in FIG. 3.

Housing 30 includes a generally cylindrical portion 40 at one end thereof through which output shaft 36 extends, and a shaped end 42 opposite to cylindrical portion 40 for receiving and retaining boss 32 and drive gear 34, and for receiving screwdriver 26 during adjustment operation. An end cavity 44 is provided in cylindrical portion 40 and receives an O-ring 46 or other seal seated in end cavity 44 and against output shaft 36 extending slidably there through. On the outer surface thereof, cylindrical portion 40 includes a plurality of lugs 48 extending outwardly so that adjustor 20 can be inserted in a properly shaped hole 50 of assembly panel 22 and turned to thereby lock adjustor 20 in position in panel 22. Various structures well-known to those skilled in the art can be used for securing adjuster 20 in panel 22.

Shaped end 42 of housing 30 defines a back 52 projecting generally radially outwardly from cylindrical portion 40 at an end thereof opposite to end cavity 44. Centrally therein, shaped end 42 defines a series of stepped cavities of increasing diameter. Accordingly, a first boss retaining cavity 54 leads to a gear retaining cavity 56. Gear retaining cavity 56 further defines a radial undercut 58. A generally cylindrical wall 60 extends axially from the outer edge of back 52 and defines an open access well 62 for receiving screwdriver 26 and guiding screwdriver 26 toward gear 34. In the exemplary embodiment, well 62 is tapered inwardly for directing screwdriver 26 or another tool to operatively engage driver gear 34.

Boss retaining cavity 54 is a non-circular shape at its periphery and in the exemplary embodiment has shaped peripheral surface 64 with adjacent flat surfaces. Gear retaining cavity 56 is generally circular at its outer periphery, having a smoothly curved cylindrical wall surface 66.

Figure 5:
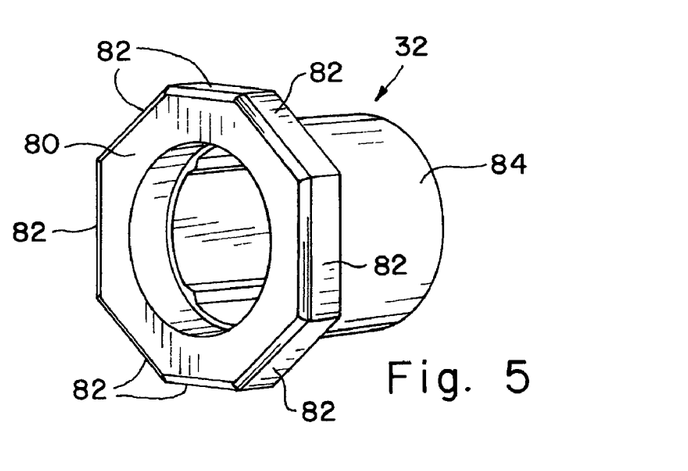
FIG. 5 is a perspective view of a thin wall boss provided in the adjuster shown in the previous drawings.
Figure 6:
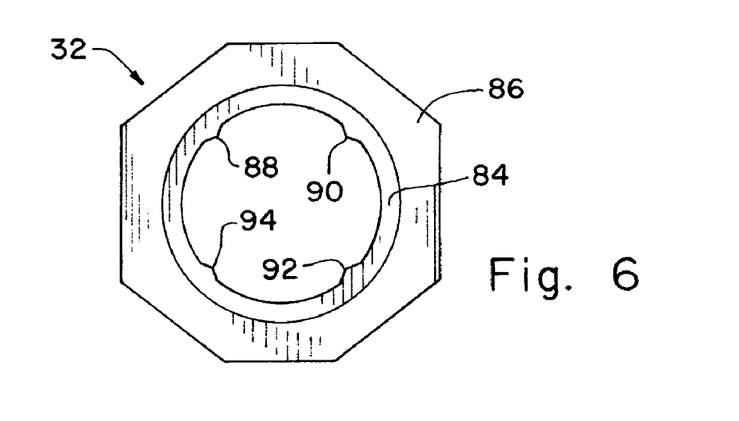
FIG. 6 is an end view of the boss shown in FIG. 5.

Boss 32 will be described with reference particularly to FIGS. 5 and 6. Boss 32 includes a head 80 of a complementary shape for fitting into the shaped boss retaining cavity 54. Accordingly, in the exemplary embodiment shown, head 80 is shaped with facets 82 for seating in boss retaining cavity 54 such that facets 82 confront wall surface 64, and boss 32 is held non-rotatably in housing 30. A thin walled sleeve 84 extends axially from head 80 and is of diameter less than head 80 such that a radial shoulder 86 is defined between the outer surface of sleeve 84 and the adjoining end surface of head 80. On an inner surface thereof, thin walled sleeve 84 defines a plurality of inwardly projecting, axially oriented splines 88, 90, 92, 94, and in the exemplary embodiment includes four splines 88, 90, 92 and 94. It should be understood that more than four splines or fewer than four splines can be used, and the spline can be oriented angularly rather than axially.

Figure 7:
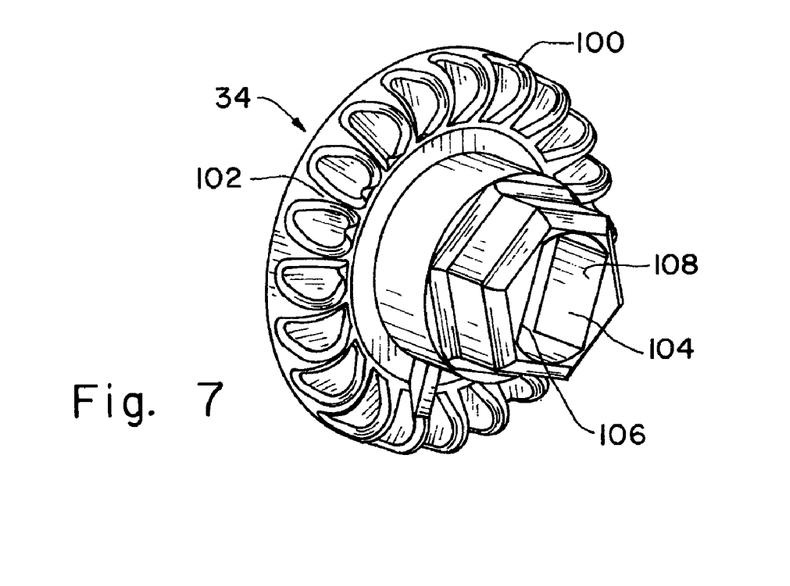
FIG. 7 is a perspective view of the drive gear for the adjuster shown in FIG. 1.

Drive gear 34 (FIG. 7) includes a face gear 100 having a plurality of teeth 102 formed in a ring at the periphery thereof. An axial opening 104 through gear 34 has opposed flat segments 106, 108. Behind gear 100, a rim 110 is provided to be received in gear retaining cavity 56. Rim 110 defines a radial lip 112.

Figure 8:
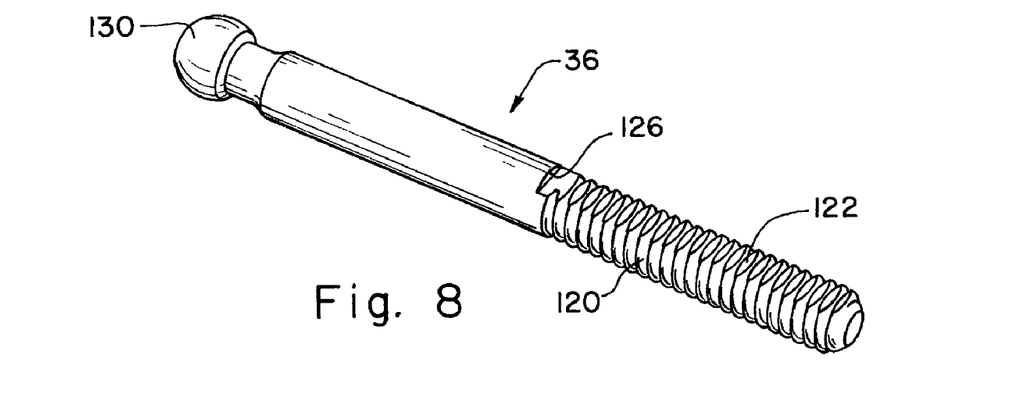
FIG. 8 is a perspective view of the output shaft for the adjuster shown in FIG. 1.
Figure 10:
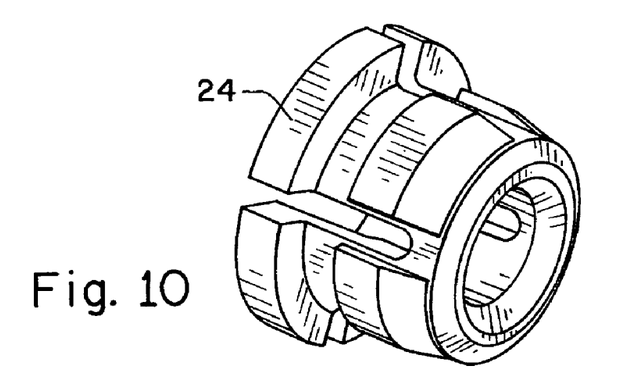
FIG. 10 is a perspective view of an annular cup or ball socket for engaging the bulbous end of the screw in a headlamp assembly.

Output shaft 36 includes a threaded portion or end 120 having a screw thread thereon with flattened axial portions 122, 124 on generally opposite sides for encountering flat surfaces 106, 108 in axial opening 104 of drive gear 32. At the inner end of threaded end 120, shoulder stops 126, 128 are defined. A bulbous end 130 at the end opposite threaded end 120 is received in cup 24.

The assembled configuration of adjustor 20 will now be described more fully, with respect to the structural features of housing 30, boss 32, drive gear 34 and output shaft 36 as just described. Head 80 of thin walled boss 32 is positioned within boss retaining cavity 54 such that facets 82 are disposed against the complementary surfaces of peripheral wall surface 64 of cavity 54. Accordingly, boss 32 is not rotatable in cavity 54, relative to housing 30. Gear 34 is positioned in gear retaining cavity 56, and is locked into a rotatable position within housing 30 from a snap-fit engagement of radial undercut 58 in housing 30 and radial lip 112 of drive gear 34. The overlapping relationship thereby defined keeps drive gear 34 in the installed position but allows rotation of drive gear 34 relative to housing 30. In the assembled configuration of the exemplary embodiment, rim 110 of drive gear 34 overlaps shoulder 86 of boss 32. Accordingly, when drive gear 34 is locked into position in housing 30 boss 32 is also axially confined in housing 30. While boss 32 is not rotatable, drive gear 34 is readily rotatable within smooth peripheral wall surface 66. The nested relationship of boss 32 and gear 34 locked in housing 30 provides a compact structure for the adjuster that is assembled easily.

Thin wall sleeve 84 is not constrained outwardly thereof, and a space 140 is defined between the outer surface of sleeve 84 and the inner surface of drive gear 34 in which it is disposed. Space 140 provides ample area wherein sleeve 84 can deform or distort.

In the assembled configuration, gear 100 is exposed at the inner end of well 62 such that screwdriver 26 can be inserted to engage gear teeth 102 for rotating gear 34.

Output shaft 36 is inserted through cylindrical portion 40 to seat in sliding engagement against O-ring 46 disposed in end cavity 44. Threaded end 120 is extended through boss 32 and drive gear 34 to project outwardly thereof. Flattened areas 122, 124 of threaded end 120 align with and against flat surfaces 106, 108 of gear 34. Accordingly, output shaft 36 is held non-rotatably relative to drive gear 34, and instead rotates together with rotation of drive gear 34. However, gear 34 and shaft 36 are axially movable relative to each other even while rotating in unison.

Contact between the threaded end 120 and boss 32 is limited to the minimal contact defined by the cross-sectional area of spaced splines 88, 90, 92, 94. As threaded end 120 is rotated, the threads thereon cut or form threads in splines 88, 90, 92 and 94. Thin walled sleeve 84 which encircles shaft 36 does not otherwise engage shaft 36, except for the circumferentially limited engagement of axial splines 88, 90, 92, 94 with threaded end 120.

Figure 9:
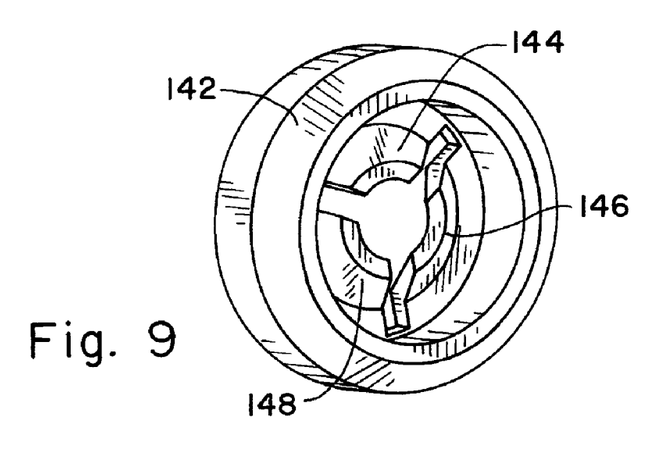
FIG. 9 is a perspective view of an axial stop collar for limiting travel of the adjuster output shaft.

A stop collar 142 is placed on threaded end 120, to limit the axial movement of output shaft 36 via the interference of stop 142 against drive gear 34. Stop collar 142 is removable and positionable, having tabs 144, 146 and 148 for engaging threaded end 120 on shaft 36

Adjuster 20 is installed in fixed panel 22 by inserting and rotating to lock lugs 48 behind the panel. A yielding washer or seal 150 can be provided between panel 22 and back 52. Cup 24 is attached to a movable component, such as for example, a headlight reflector. With housing 30 fixed in relative position, axial movement of shaft 36 moves cup 24 and any structure to which cup 24 is connected.

After installation of adjuster 20 in panel 22, adjuster 20 can be adjusted by inserting screwdriver 26 into well 62, to engage gear 34. Rotation of drive gear 34 via screwdriver 26 causes rotation of output shaft 36. Boss 32 remains non-rotatably fixed relative to housing 30. The engagement of splines 88, 90, 92, 94 of axially and rotationally fixed boss 32 against threaded end 120 causes output shaft 36 to move axially relative to housing 30, depending on the rotational direction of drive gear 34. Accordingly, adjustor 20 can be adjusted to increase or decrease the axial distance between bulbous end 130 and end cavity 44. Since bulbous end 130 is secured in cup 24, axial movement of output shaft 36 results in movement of cup 24 and consequently anything that cup 24 is attached to, such as a headlamp reflector. As those skilled in the art will understand, cup 24 generally is secured to a reflector or other adjustable component within a headlamp assembly. Accordingly, axial movement of output shaft 36 results in positional change for the component to which cup 24 is connected.

Stop collar 142 limits the axial travel of output shaft 36 in one direction, and shoulder stops 126, 128 limit the axial travel of output shaft 26 in an opposite direction relative to housing 30. When shoulder stops 126, 128 or end stop 142 are encountered, further attempts to rotate gear 34 places the engagement of splines 88, 90, 92 and 94 against threaded end 120 in axial tension. However, since there is only minimal circumferential engagement between boss 32 and output shaft 36 along splines 88, 90, 92 and 94 the buildup of tension causes splines 88, 90, 92, 94 and thin walled sleeve 84 to deflect or distort. Accordingly, before damage can occur, thin walled sleeve 84 distorts into space 140, allowing splines 88, 90, 92, 94 to ride up, out of and over the threads of threaded end 120 or to otherwise distort and temporarily disengage output shaft 36 from its threaded connection within adjustor 20. After tension in the connection between the shaft and splines is relieved, the shaft may move slightly to relieve forces therein, and the sleeve and splines return to their original shape and engage threaded end 120. If gear 34 is again rotated in the same direction, brief re-engagement of splines 88, 90, 92 and 94 with threaded end 120 can cause slight axial movement of shaft 36, until tension increases again sufficient to cause distortion of the splines and sleeve. Therefore, the potential for damage to the adjuster or to the headlamp assembly is reduced even if a power tool is used to rotate gear 34 for an extended period longer than required to move shaft 36 to one of the extreme positions. Upon rotation of gear 34 in the opposite direction, regular engagement that is reestablished between threaded end 120 and splines 88, 90, 92 and 94, results in axial movement of output shaft 36 in the opposite direction until the opposite stop or limitation is encountered. If gear 34 continues to be rotated, a similar clutching effect occurs from the distortion of the sleeve or splines, to relieve tension building in the adjuster The number of splines used, the thickness of the splines and sleeve, and the materials used therefore can be selected to provide the desired tolerance to tension before distortion or displacement occurs sufficient to disengage the boss from the shaft. The height of the splines and the inside diameter thereof relative to the diameter of the threaded end of the output shaft determine the height of threads cut in the splines and the amount of distortion required to disengage the splines from the threaded end of the shaft. Further, while the sleeve has been shown and described as a continuous cylinder, it should be understood that the splines could be provided as a circumferentially discontinuous body. The material used for the boss, including the sleeve and splines should be one that can distort adequately to disengage, then return to its previous shape after tension has been relieved in repeated cycles over time. Various plastics are suitable materials for the boss.

Figure 11:
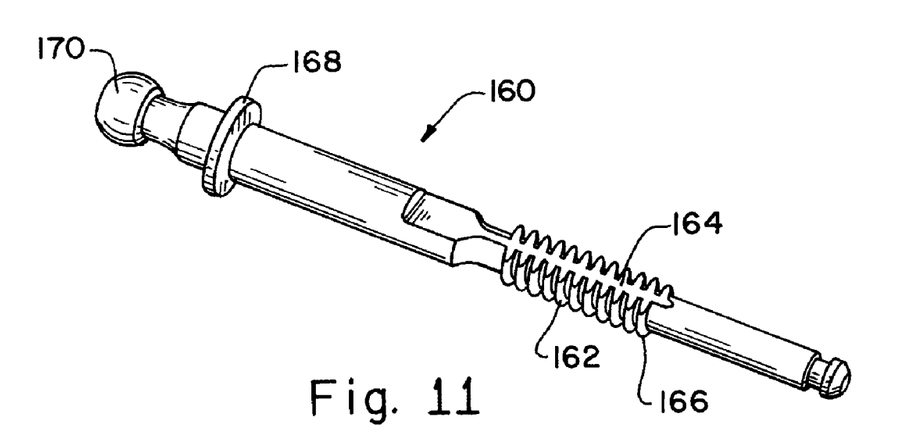
FIG. 11 is another embodiment of a screw for use with a headlamp adjuster of the present invention.

FIG. 11 illustrates a further embodiment of an output shaft 160 having a threaded end 162, flattened areas 164, 166 and an integral ring 168 in place of the shoulder stops described with respect to output shaft 36. A bulbous end 170 is provided for selective engagement with a cup such as cup 24 or other structure to be adjusted. Shaft 160 is used similarly to shaft 36, as described above.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An automobile headlamp adjuster comprising:
   a housing configured to be secured to a headlamp assembly panel;
   a shaft extending through said housing, said shaft having an end for engaging a headlamp reflector and a threaded portion provided along at least a portion of a length of said shaft; and
   a boss fixed in axial and rotational position relative to said housing, said boss having at least one member of circumferentially limited dimension engaging said threaded portion of said shaft such that rotation of said shaft causes axial movement of said shaft relative to said housing, said boss having a thin wall sleeve encircling said shaft and defining a space outwardly thereof, into which said at least one member is radially deformable in response to forces created in the engagement of said at least one member and said threaded portion.

2. The adjuster of claim 1, said at least one member being a spline on an inner surface of said sleeve.

3. The adjuster of claim 1, said at least one member being a plurality of spaced splines substantially axially positioned along an inner surface of said sleeve.

4. An automobile headlamp adjuster comprising:
   a housing configured to be secured to a headlamp assembly panel;
   a shaft extending through said housing, said shaft having an end for engaging a headlamp reflector and a threaded portion provided along at least a portion of a length of said shaft;
   a boss fixed in axial and rotational position relative to said housing, said boss having at least one member of circumferentially limited dimension engaging said threaded portion of said shaft such that rotation of said shaft causes axial movement of said shaft relative to said housing;
   a space defined outwardly of said at least one member into which said at least one member is radially deformable in response to forces created in the engagement of said at least one member and said threaded portion;
   a gear held rotatably in said housing and non-rotatably on said shaft for co-rotation with said shaft; and
   wherein said shaft has a flattened portion along an axial extent thereof, and said gear has an axial opening including a flat segment engaged on said flat portion, said gear and said shaft being non-rotatable but axially movable relative to each other.

5. An automobile headlamp adjuster comprising:
   a housing configured to be secured to a headlamp assembly panel;
   a shaft extending through said housing, said shaft having an end for engaging a headlamp reflector and a threaded portion provided along at least a portion of a length of said shaft;
   a boss fixed in axial and rotational position relative to said housing, said boss having at least one member of circumferentially limited dimension engaging said threaded portion of said shaft such that rotation of said shaft causes axial movement of said shaft relative to said housing;
   a space defined outwardly of said at least one member into which said at least one member is radially deformable in response to forces created in the engagement of said at least one member and said threaded portion;
   a gear held rotatably in said housing and non-rotatably on said shaft for co-rotation with said shaft; and
   wherein said gear and said housing define a lip and an undercut for snap-fit attachment of said gear in said housing.

6. The adjuster of claim 5, said boss having a head held against relative rotation in said housing, and said gear overlapping said head to confine said boss against axial movement in said housing.

7. An automobile headlamp adjuster comprising:
   a housing configured to be secured to a headlamp assembly panel;
   a shaft extending through said housing, said shaft having an end for engaging a headlamp reflector and a threaded portion provided along at least a portion of a length of said shaft, said shaft having a collar as a monolithic body and having limited axial travel relative to said housing in opposite directions;
   a boss fixed in axial and rotational position relative to said housing, said boss having at least one member of circumferentially limited dimension engaging said threaded portion of said shaft such that rotation of said shaft causes axial movement of said shaft relative to said housing; and
   a space defined outwardly of said at least one member into which said at least one member is radially deformable in response to forces created in the engagement of said at least one member and said threaded portion.

8. An automobile headlamp adjuster comprising:
   a housing configured to be secured to a headlamp assembly panel;
   a shaft extending through said housing, said shaft having an end for engaging a headlamp reflector and a threaded portion provided along at least a portion of a length of said shaft, said shaft having limited axial travel relative to said housing in opposite directions;
   a boss fixed in axial and rotational position relative to said housing, said boss having at least one member of circumferentially limited dimension engaging said threaded portion of said shaft such that rotation of said shaft causes axial movement of said shaft relative to said housing;
   a space defined outwardly of said at least one member into which said at least one member is radially deformable in response to forces created in the engagement of said at least one member and said threaded portion; and
   a releasable collar secured in axial position on said shaft.

9. An automobile headlamp adjuster comprising:
   a housing;
   a shaft extending through said housing, said shaft having an end for engaging a headlamp reflector and a screw thread provided along at least a portion of a length of said shaft;
   a gear held rotatably in said housing, said gear being co-rotatable with said shaft, said shaft being axially movable relative to said gear; and a boss in fixed axial and rotatable positions relative to said housing, said boss disposed at least partially within the gear and said boss having a radially deflectable member engaging said thread on said shaft.

10. The headlamp adjuster of claim 9, said boss having a plurality of radially deflectable members engaging said thread on said shaft.

11. The headlamp adjuster of claim 10, said boss having a head secured in said housing and a thin walled deflectable sleeve, said plurality of radially deflectable threaded members being splines on an inner surface of said sleeve.

12. The headlamp adjuster of claim 10, an annular space defined outwardly of said thin wall deflectable sleeve.

13. The headlamp adjuster of claim 9, including axial stops on said shaft limiting axial movement of said shaft relative to said housing.

14. The headlamp adjuster of claim 13, at least one of said stops being a removable collar disposed on said shaft.

15. The headlamp adjuster of claim 13, one of said stops being a radial feature integral with said shaft.

16. The headlamp adjuster of claim 13, said gear and said boss being nested one against the other in said housing.

17. A vehicle headlamp adjuster, comprising:

a housing;

a boss in said housing having a thin walled deflectable sleeve, said sleeve being unsupported outwardly thereof and having a plurality of axial splines on an inner surface thereof, said boss being held substantially fixed axially and rotatably relative to said housing;

a shaft extending through said housing and said sleeve, said shaft having an end for engaging a headlamp reflector and a thread provided along at least a portion of a length of said shaft, said thread engaging said splines; and an adjustment gear co-rotatable with said shaft in said housing, wherein at least a portion of said boss extends into said adjustment gear;

said shaft being axially movable relative to said housing and relative to said gear between fixed axial limits;

said sleeve being radially deformable in response to increasing forces in the engagement of said shaft and said splines, to disengage said splines from said threaded portion of said shaft.

* * * * *